United States Patent
Liu

(10) Patent No.: US 8,083,794 B2
(45) Date of Patent: Dec. 27, 2011

(54) REPLICA EYE

(75) Inventor: Bao-Shuai Liu, Shenzhen (CN)

(73) Assignees: Hong Fu Jin Precision Industry (ShenZhen) Co., Ltd., Shenzhen, Guangdong Province (CN); Hon Hao Precision Industry Co., Ltd., Tu-Cheng, New Taipei (TW)

( * ) Notice: Subject to any disclaimer, the term of this patent is extended or adjusted under 35 U.S.C. 154(b) by 205 days.

(21) Appl. No.: 12/564,927

(22) Filed: Sep. 23, 2009

(65) Prior Publication Data

US 2010/0121440 A1  May 13, 2010

(30) Foreign Application Priority Data

Nov. 12, 2008  (CN) .......................... 2008 1 0305513

(51) Int. Cl.
*A61F 2/14* (2006.01)
*A61F 2/16* (2006.01)
(52) U.S. Cl. .......................... 623/6.64; 623/4.1; 446/389
(58) Field of Classification Search ................. 623/6.64, 623/4.1; 446/389, 392
See application file for complete search history.

(56) References Cited

U.S. PATENT DOCUMENTS

| | | | | |
|---|---|---|---|---|
| 3,155,090 A * | 11/1964 | Holter | ............................ | 600/432 |
| 3,364,501 A * | 1/1968 | Stafford | ........................ | 623/6.64 |
| 3,480,971 A * | 12/1969 | Smith | ........................... | 623/6.64 |
| 3,973,838 A * | 8/1976 | Page | .......................... | 351/160 R |
| 4,272,910 A * | 6/1981 | Danz | .............................. | 446/389 |
| 4,332,039 A * | 6/1982 | LaFuente | ...................... | 623/6.64 |
| 4,373,218 A * | 2/1983 | Schachar | ..................... | 623/6.13 |
| 4,685,447 A * | 8/1987 | Iversen et al. | ................. | 128/899 |
| 4,902,292 A * | 2/1990 | Joseph | .......................... | 623/6.64 |
| 5,108,427 A * | 4/1992 | Majercik et al. | ............. | 623/5.12 |
| 6,582,465 B2 * | 6/2003 | Tse | .................. | 623/6.64 |
| 7,485,025 B2 * | 2/2009 | Schnuckle | .................... | 446/392 |

* cited by examiner

*Primary Examiner* — Paul Prebilic
(74) *Attorney, Agent, or Firm* — Altis Law Group, Inc.

(57) ABSTRACT

A replica eye includes a dome-shaped eyeball, a back simulating member, a front simulating member, a container, at least one tube, and a driving member. The eyeball includes a light-transmitting area for transmitting light. The back simulating member has a simulating surface being a first color. The front simulating member has a resilient capsule being a second color other than the first color. The resilient capsule is attached to the simulating surface, and arranged between the simulating surface and the light-transmitting area. The container is used for accommodating fillers. The at least one tube is capable of passing through the simulating surface to connect between the resilient capsule and the container. The driving member is coupled to the container for driving the fillers received in the container move towards and away from resilient capsule via the tube.

13 Claims, 7 Drawing Sheets

REPLICA EYE

BACKGROUND

1. Technical Field

The present disclosure relates to replicas of human organs, and particularly to a replica of an eye.

2. Description of Related Art

With the development of electronic technology, replica figures simulate the actions of living creatures, such as walking and jumping. Because eyes can be so expressive in living creatures, they have received much attention in the effort to allow replicas to simulate feelings. However, most replicas of eyes only open and shut which is not very expressive. Therefore, what is needed, are more expressive replica eyes.

DETAILED DESCRIPTION

Figure 1:
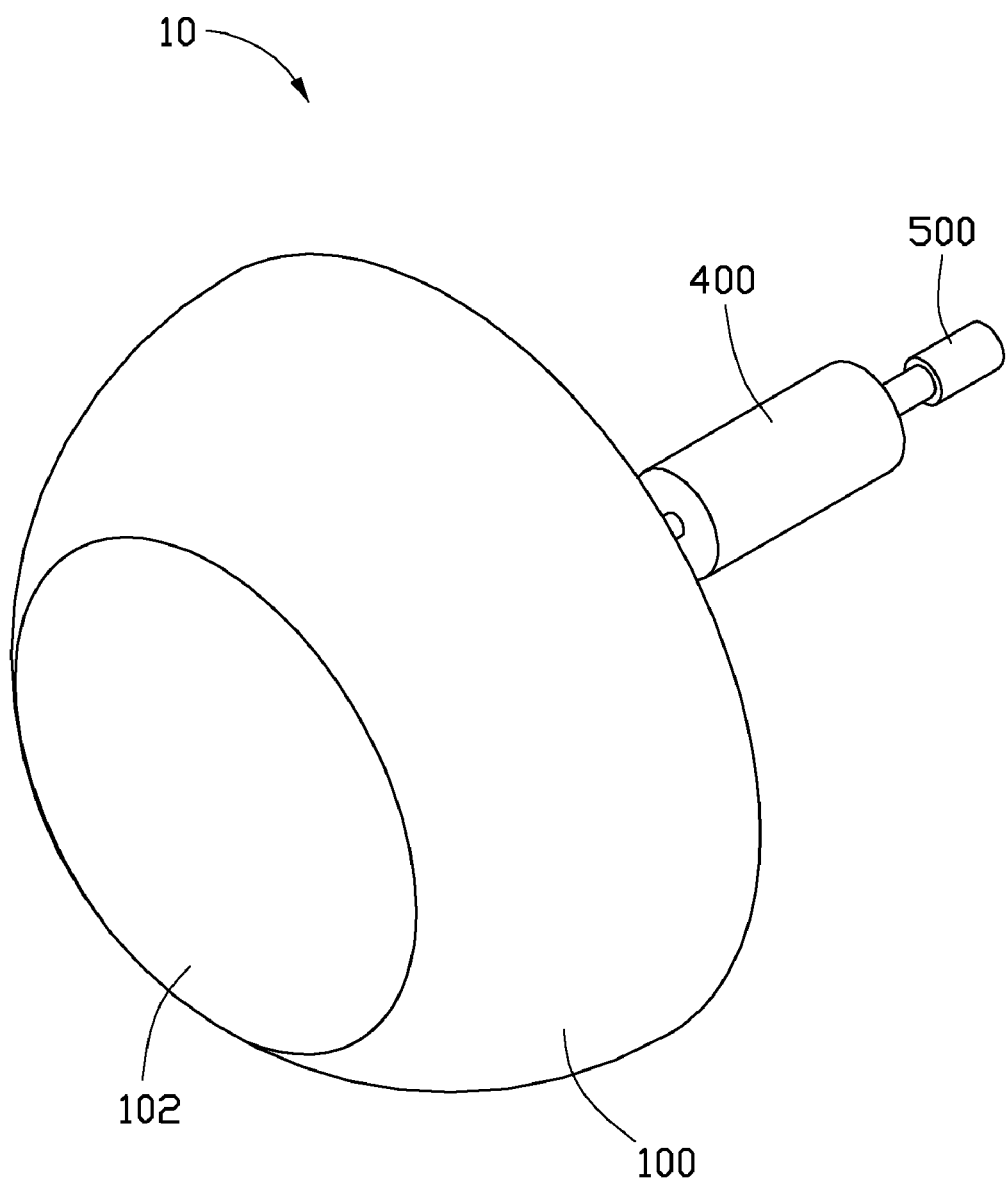
FIG. 1 is an isometric view of a replica eye with a dome-shaped eyeball in accordance with an exemplary embodiment.
Figure 2:
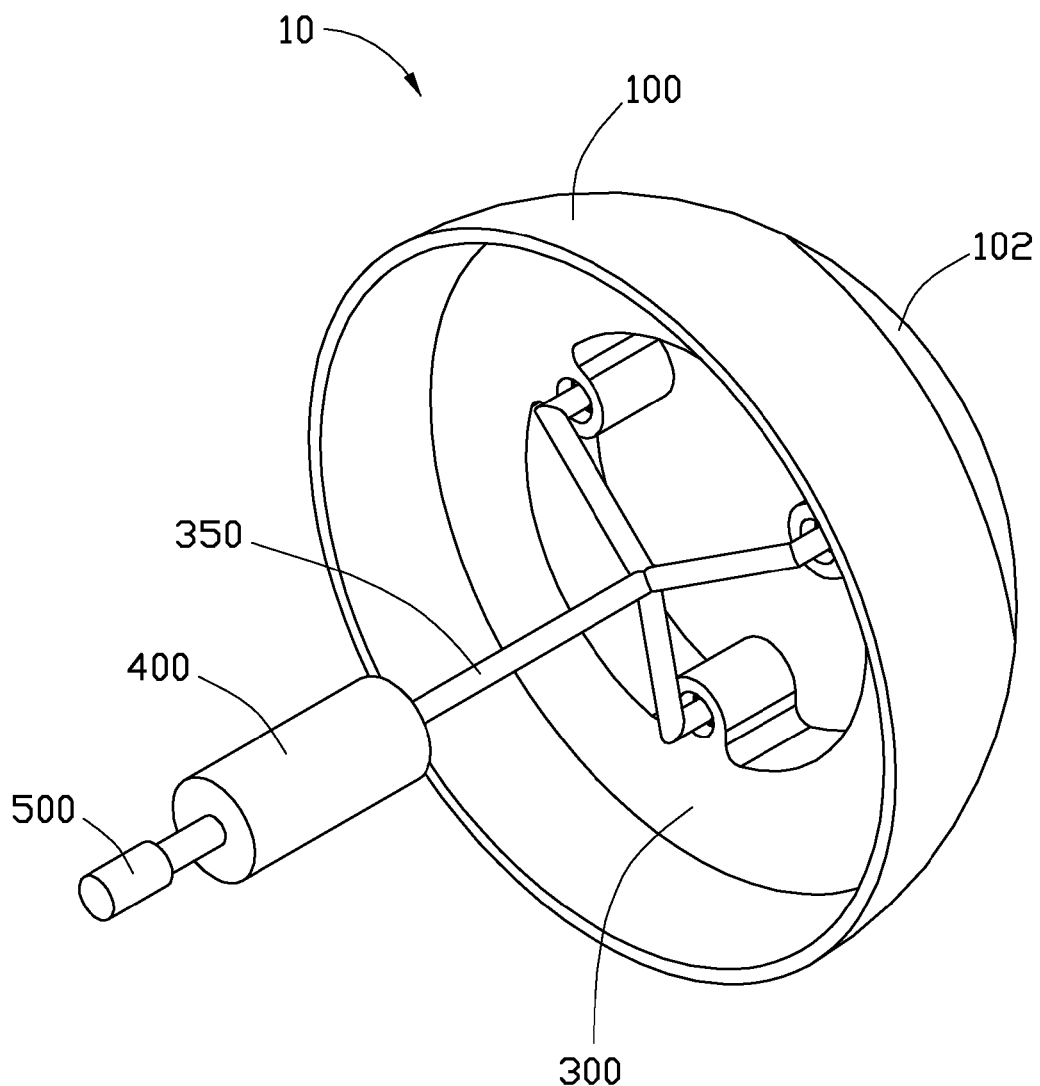
FIG. 2 is an isometric view of the replica eye of FIG. 1 but viewed from a reverse direction to FIG. 1.
Figure 3:
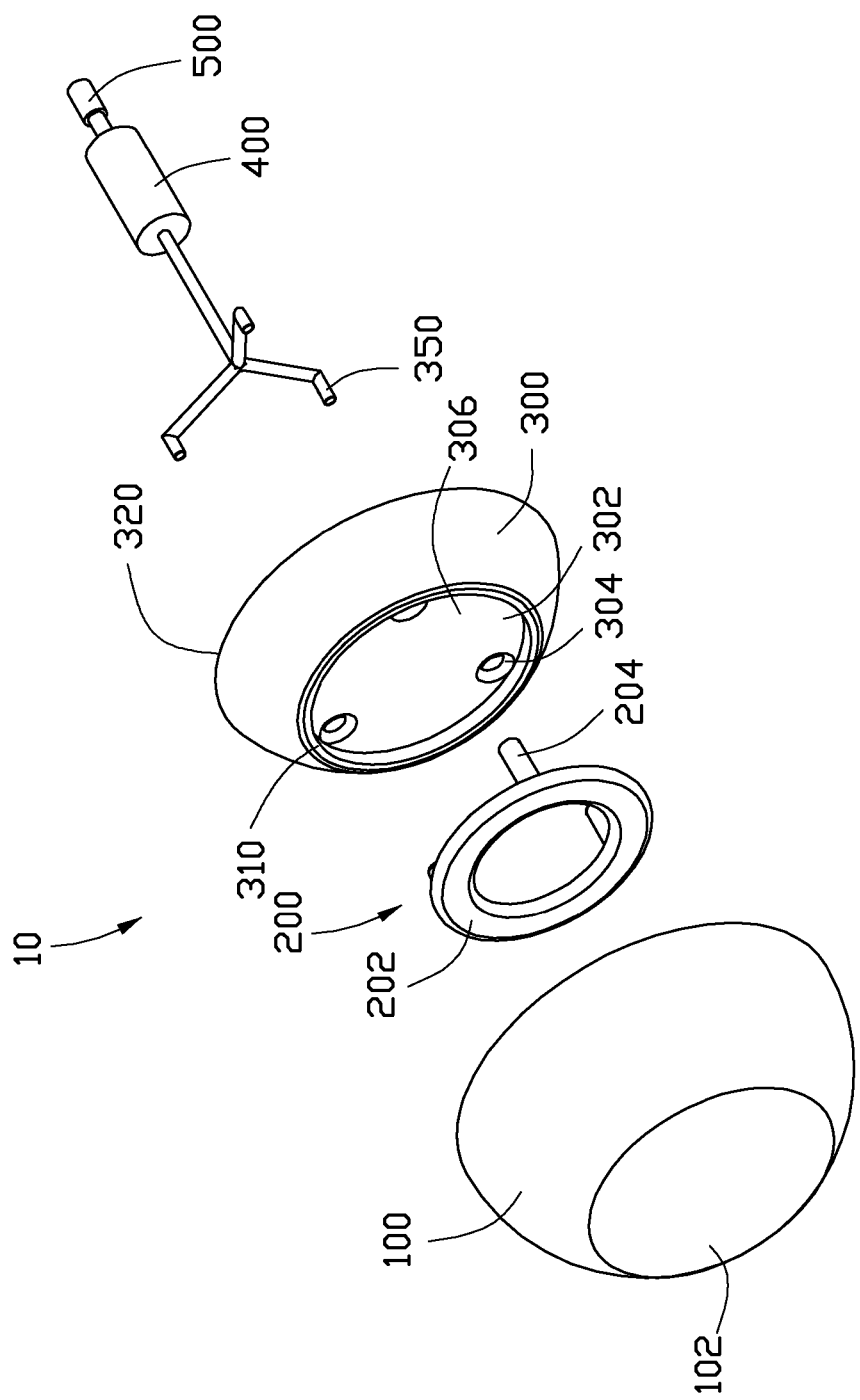
FIG. 3 is an exploded view of the replica eye of FIG. 1.

Referring to FIGS. 1-3, a replica eye 10 includes a substantially dome-shaped eyeball 100, a back simulating member 300, a front simulating member 200, a plurality of tubes 350, a cylindrical container 400, and a driving member 500. The front simulating member 200 and the back simulating member 300 are received in the eyeball 100. The plurality of tubes 350 is connected between the front simulating member 200 and the cylindrical container 400. The driving member 500 is coupled to the container 400.

Figure 4:
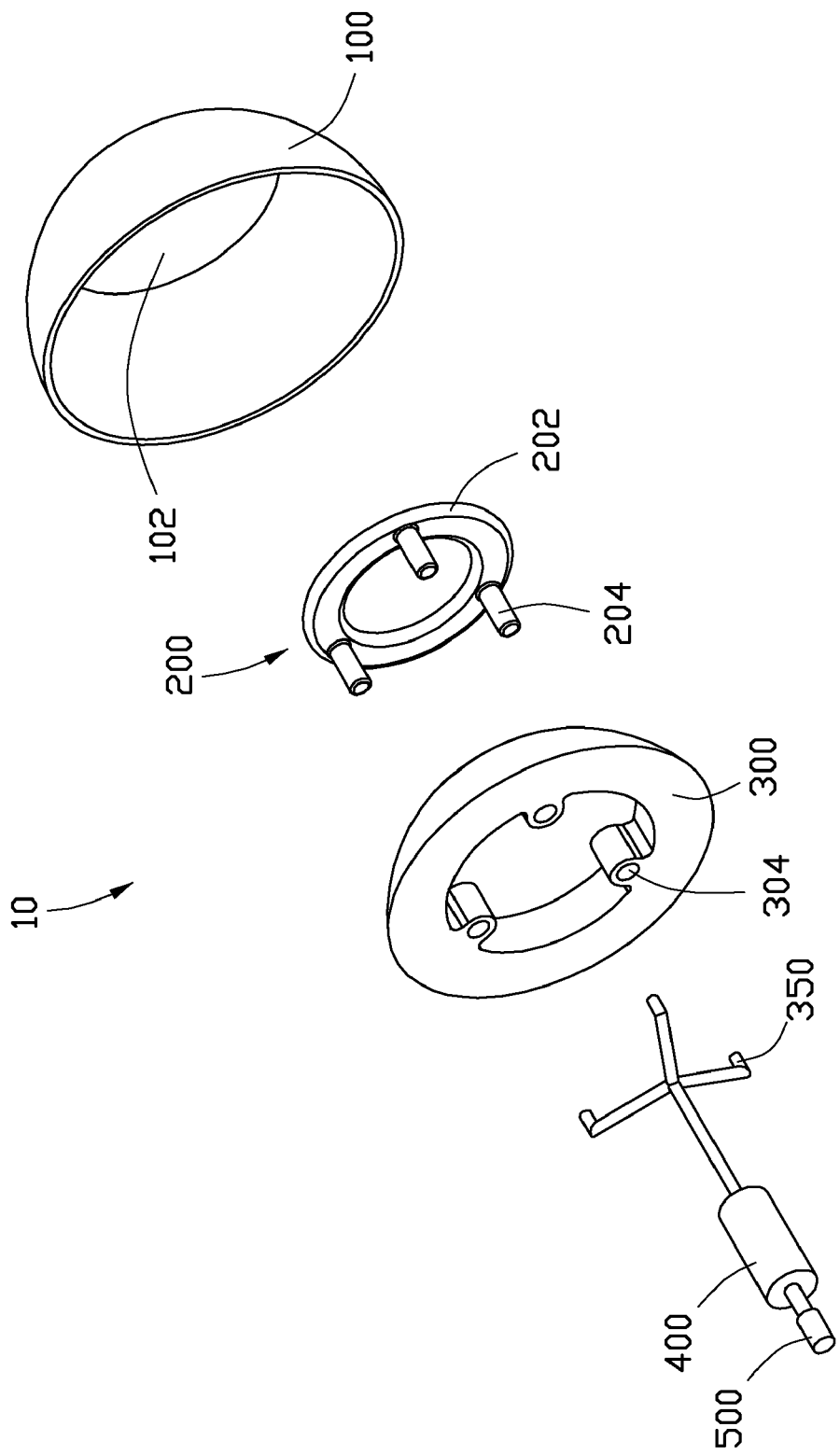
FIG. 4 is an exploded view of the replica eye of FIG. 1 but viewed from a reverse direction to FIG. 3.
Figure 5:
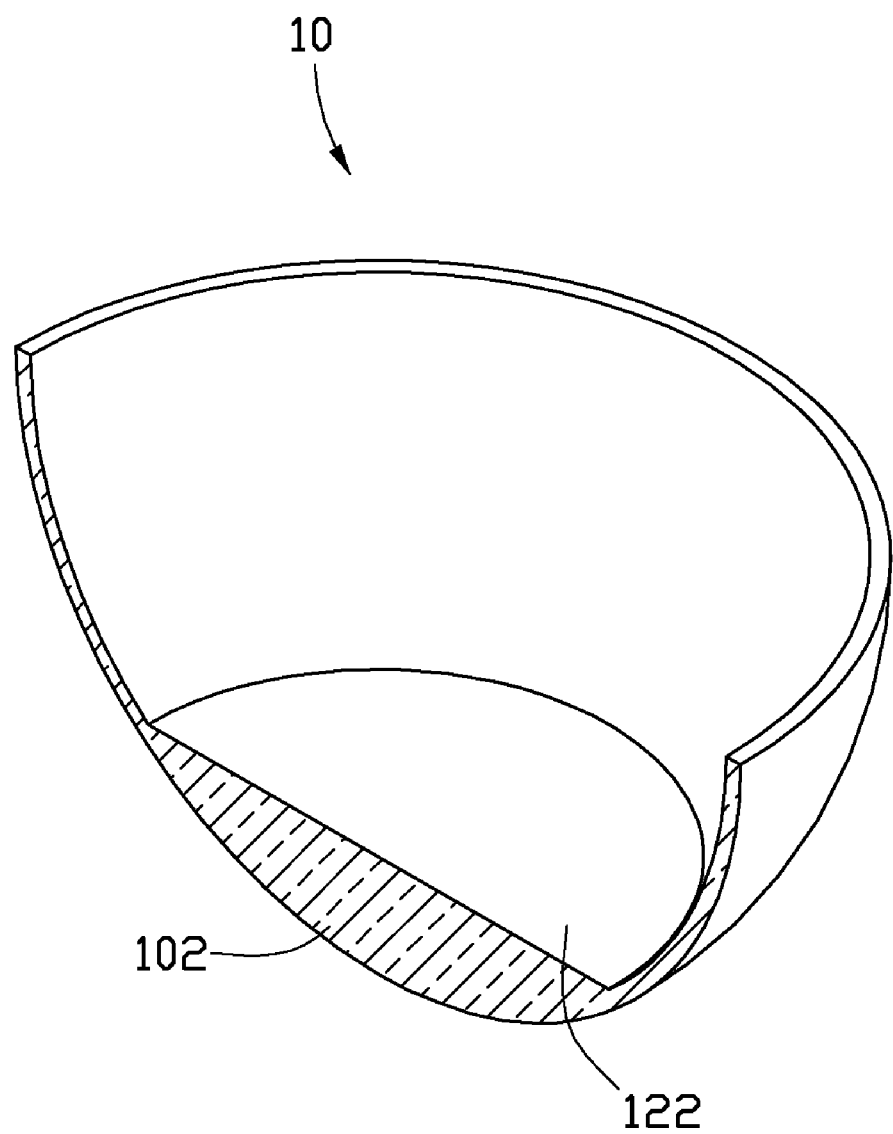
FIG. 5 is a cross-sectional view of the dome-shaped eyeball in FIG. 1.

Referring to FIGS. 3-5, the eyeball 100 has a circular light-transmitting area 102 capable of transmitting light. The light-transmitting area 102 is arranged on the front of the eyeball 100. In the embodiment, the light-transmitting area 102 is a transparent area, and an inner surface 122 of the transparent area is flat. In other embodiments, the eyeball 100 may define an opening in the front of the eyeball 100 instead of the transparent area 102.

The back simulating member 300 is shaped like a truncated cone having two ends 310, 320 such as a first end 310 and a second end 320 opposite to the first end 310. A diameter of the first end 310 is smaller than that of the second end 320. The first end 310 faces the light-transmitting area 102 of the eyeball 100. The back simulating member 300 has a flat circular simulating surface 302 on the first end 310, and the simulating surface 302 is recessed away from the light-transmitting area 102 to form a receiving space 306 in the first end 310. The simulating surface 302 is a first color. The back simulating member 300 further defines a plurality of through holes 304 connected with the first end 310 and the second end 320.

The front simulating member 200 includes an annular resilient capsule 202 and a plurality of pipes 204 partially inserted into the resilient capsule 202. The resilient capsule 202 is received in the receiving space 306 and attached to the simulating surface 302. A diameter of the simulating surface 302 is larger than or equal to an external diameter of the resilient capsule 202. The plurality of pipes 204, after passing through the corresponding through holes 304, connects with the plurality of tube 350 correspondingly. The resilient capsule 202 is a second color other than the first color.

The container 400 is used for accommodating fillers such as liquids, granular solids or gases. In the embodiment, the container 400 may be a cylinder with a piston (not shown). The driving member 500 is used for driving the filler received in the container 400 to flow through the plurality of tube 350 towards and away from the resilient capsule 202. In the embodiment, the driving member 500 may be a linear motor for moving the piston linearly to drive the fillers.

Figure 6:
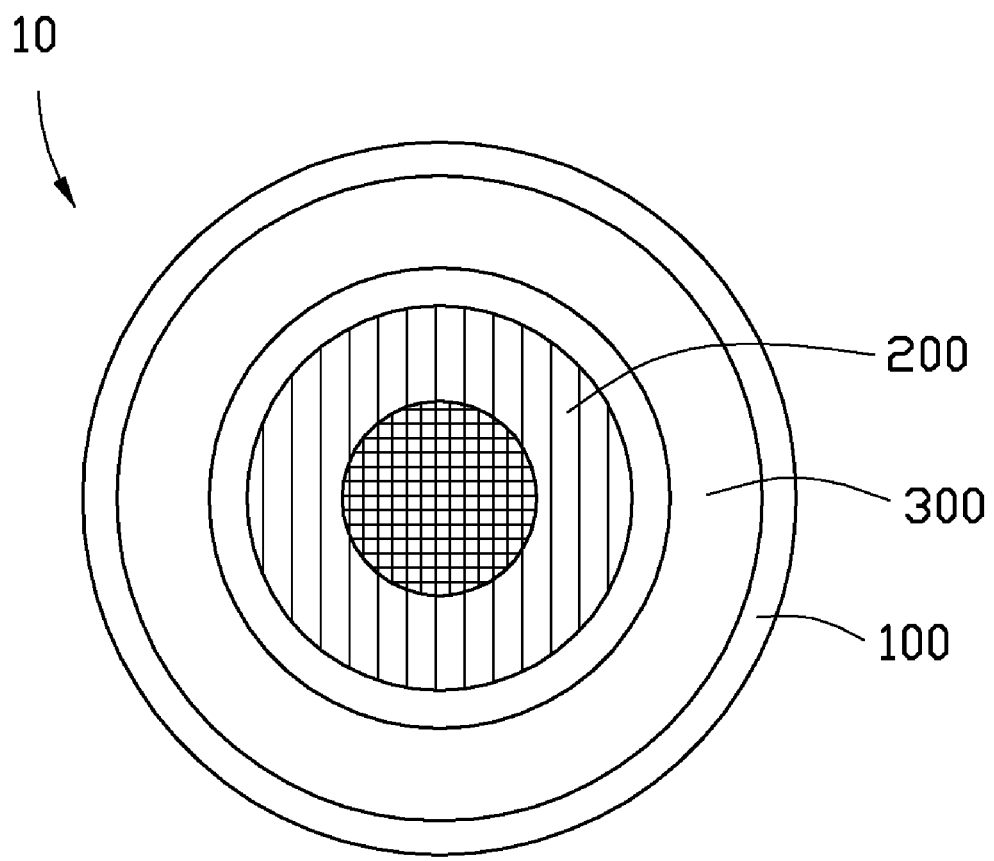
FIG. 6 is a schematic view of the replica eye of FIG. 1 in a first state.

In use, referring to FIG. 6, the simulating surface 302 of the back simulating member 300 simulates a pupil, the resilient capsule 202 of the front simulating member 200 simulates an iris. When the driving member 500 drives the fillers received in the container 400 to move towards the resilient capsule 202, the resilient capsule 202 is dilated in the receiving space 304, the simulating surface 302 viewed from the resilient capsule 202 is decreased, such that contraction of the pupil of the replica eye 10 occurs.

Figure 7:
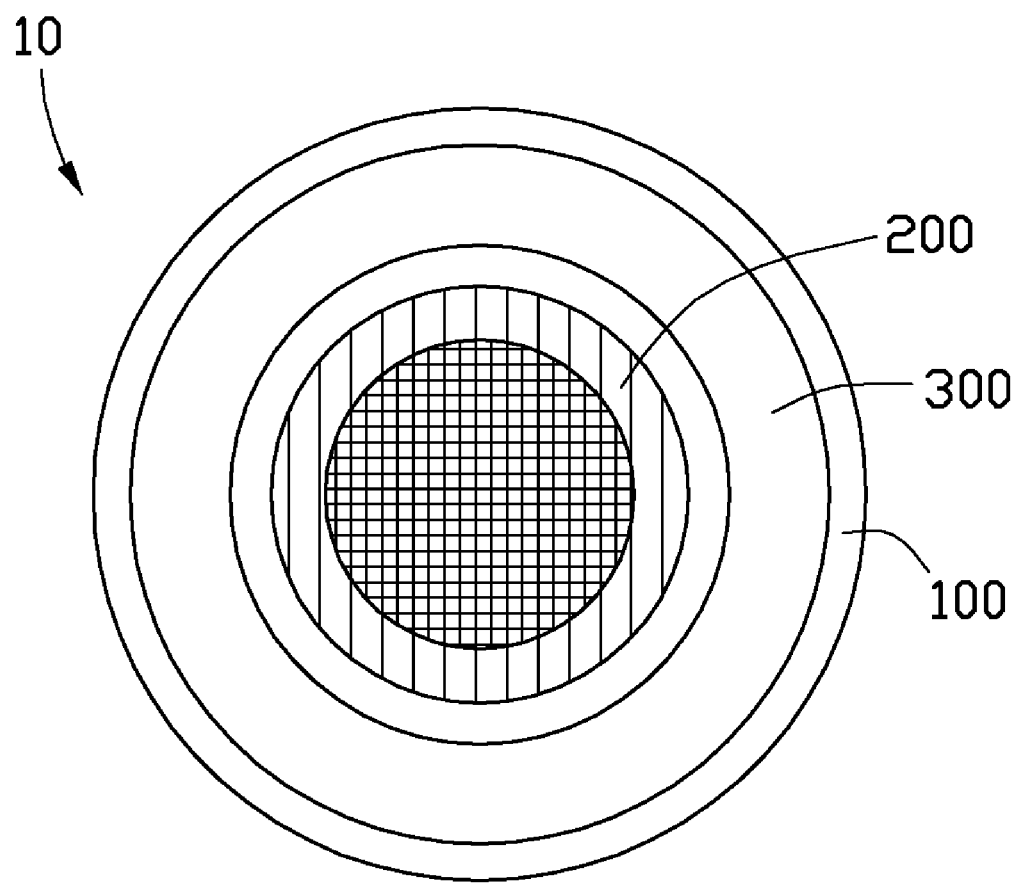
FIG. 7 is a schematic view of the replica eye of FIG. 1 in a second state.

Referring to FIG. 7, when the driving member 500 drives the fillers received in the resilient capsule 202 to return to the container 400, the resilient capsule 202 is contracted in the receiving space 304, the simulating surface 302 viewed from the resilient capsule 202 is increased, such that dilation of the pupil of the replica eye 10 occurs. In this way the replica eye 10 is able to dilate or contract in a manner realistically simulating a living eye.

In other embodiments, the resilient capsule 202 may be disc-shaped to simulate a pupil, and the simulating surface 302 simulates an iris. When the driving member 500 drives the fillers received in the container 400 to move towards the resilient capsule 202, the resilient capsule 202 is dilated in the receiving space 304, such that dilation of the pupil of the replica eye 10 occurs. When the driving member 500 drives the fillers received in resilient capsule 202 to return to the container 400, the resilient capsule 202 is contracted in the receiving space 304, such that contraction of the pupil of the replica eye 10 occurs.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A replica eye, comprising:
a dome-shaped eyeball with a light-transmitting area for transmitting light;
a back simulating member comprising a simulating surface being a first color;
a front simulating member comprising a resilient capsule being a second color other than the first color, the resilient capsule being attached to the simulating surface, and arranged between the simulating surface and the light-transmitting area, the simulating surface viewed from the light-transmitting area is increased when the resilient capsule is contracted, and the simulating surface viewed from the light-transmitting area is decreased when the resilient capsule is inflated;
a container for accommodating fillers;
at least one tube capable of passing through the simulating surface to connect between the resilient capsule and the container; and
a driving member coupled to the container for driving fillers received in the container to move towards and away from the resilient capsule via the at least one tube to inflate or contract the resilient capsule.

2. The replica eye according to claim 1, wherein the fillers are liquids, granular solids or gases.

3. The replica eye according to claim 1, wherein the resilient capsule is disc-shaped and simulates a pupil of the replica eye; the simulating surface simulates an iris of the replica eye; when the driving member drives the fillers received in the container to move towards the resilient capsule, the resilient capsule is dilated, such that dilation of the pupil is replicated.

4. The replica eye according to claim 3, wherein when the driving member drives the fillers received in the container to return to the resilient capsule, the resilient capsule is contracted, such that contraction of the pupil is replicated.

5. The replica eye according to claim 1, wherein the back simulating member comprises a first end facing the light-transmitting area and a second end opposite to the first end; the simulating surface is formed on the first end and recessed away from the light-transmitting area to form a receiving space for receiving the resilient capsule.

6. The replica eye according to claim 5, wherein the back simulating member is in the shape of a truncated cone, a diameter of the first end is smaller than that of the second end.

7. The replica eye according to claim 1, wherein the container is a cylinder, the driving member is a linear motor.

8. A replica eye, comprising:
a dome-shaped eyeball with a light-transmitting area for transmitting light;
a front simulating member comprising a disc-shaped resilient capsule facing the light-transmitting area, the disc-shaped resilient capsule simulating a pupil of the replica eye;
a container for accommodating fillers;
at least one tube connected between the disc-shaped resilient capsule and the container; and
a driving member coupled to the container for driving fillers received in the container to move towards and away from the resilient capsule via the at least one tube, when the driving member drives the fillers received in the container to move towards the resilient capsule, the resilient capsule viewed from the light-transmitting area being increased, such that dilation of the pupil is replicated.

9. The replica eye according to claim 8, wherein when the driving member drives the fillers received in the resilient capsule to return to the container, the resilient capsule viewed from the light-transmitting area is decreased, such that contraction of the pupil is replicated.

10. The replica eye according to claim 8, further comprising a back simulating member with a simulating surface to which the resilient capsule is attached, the simulating surface being a first color for simulating an iris of the replica eye, the resilient capsule being a second color other than the first color.

11. The replica eye according to claim 10, wherein the back simulating member further comprises a first end facing the light-transmitting area and a second end opposite to the first end; the simulating surface is formed on the first end and recessed away from the light-transmitting area to form a receiving space for receiving the resilient capsule.

12. The replica eye according to claim 11, wherein the back simulating member is in the shape of a truncated cone, a diameter of the first end is smaller than that of the second end.

13. The replica eye according to claim 8, wherein the container is a cylinder, the driving member is a linear motor.

* * * * *